United States Patent [19]

Caras et al.

[11] 3,799,586
[45] Mar. 26, 1974

[54] DUCT JOINT

[75] Inventors: Peter Caras, Tujunga; Walter E. Pike, Glendale, both of Calif.

[73] Assignee: SSP Industries, Burbank, Calif.

[22] Filed: Apr. 14, 1972

[21] Appl. No.: 244,032

[52] U.S. Cl. .................. 285/98, 285/81, 285/111, 285/165, 285/261
[51] Int. Cl. ............................................ F16l 27/06
[58] Field of Search .......... 285/165, 164, 163, 261, 285/111, 276, 98

[56] References Cited
UNITED STATES PATENTS

| | | | |
|---|---|---|---|
| 3,451,698 | 6/1969 | Chakroff | 285/165 |
| 3,314,697 | 4/1967 | Freeman | 285/263 |
| 2,815,973 | 12/1957 | Jackson | 285/111 X |
| 2,165,052 | 7/1939 | Hering | 285/111 |
| 939,908 | 11/1909 | Greenlaw | 285/263 |
| 2,846,242 | 8/1958 | Drake | 285/263 |
| 1,490,716 | 4/1924 | Schwennker | 285/111 X |

FOREIGN PATENTS OR APPLICATIONS
409,171   4/1934   Great Britain ..................... 285/263

OTHER PUBLICATIONS
Boissou – Published Patent Application – Serial No. 293,149, May 25, 1943.

*Primary Examiner*—Thomas F. Callaghan
*Attorney, Agent, or Firm*—Huebner & Worrel

[57] ABSTRACT

Flexible gastight fluid joints are disclosed arranged to accommodate rotation, angulation and axial movement. An annular seal member having inner and outer sealing lips which define a slanted gas pocket is mounted between the joint parts which rotate and angulate with respect to each other. A seal is also provided between joint parts which move axially with respect to each other and a guide surface may be included to prevent angulation of the axially movable joint parts.

6 Claims, 8 Drawing Figures

PATENTED MAR 26 1974 3,799,586

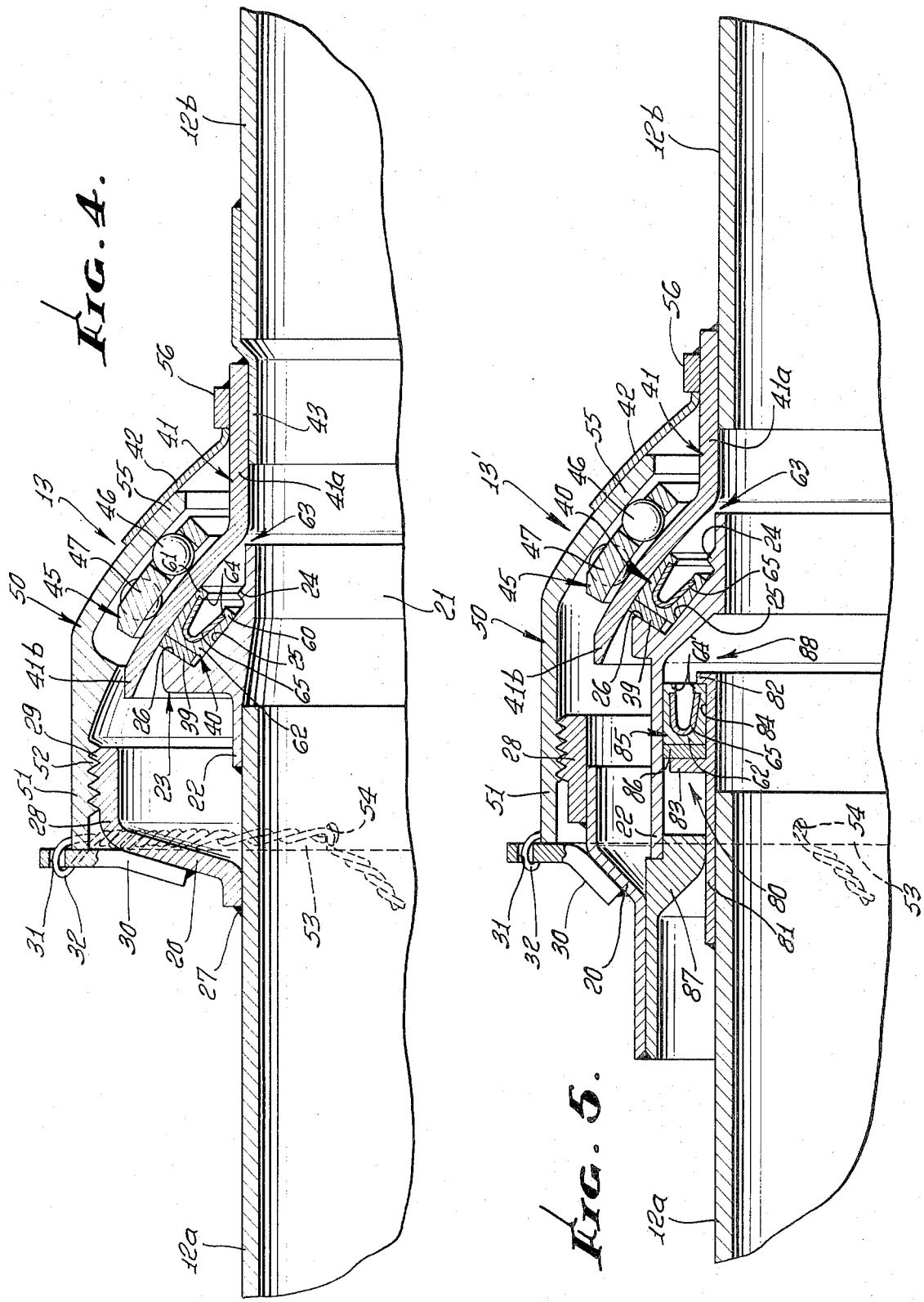

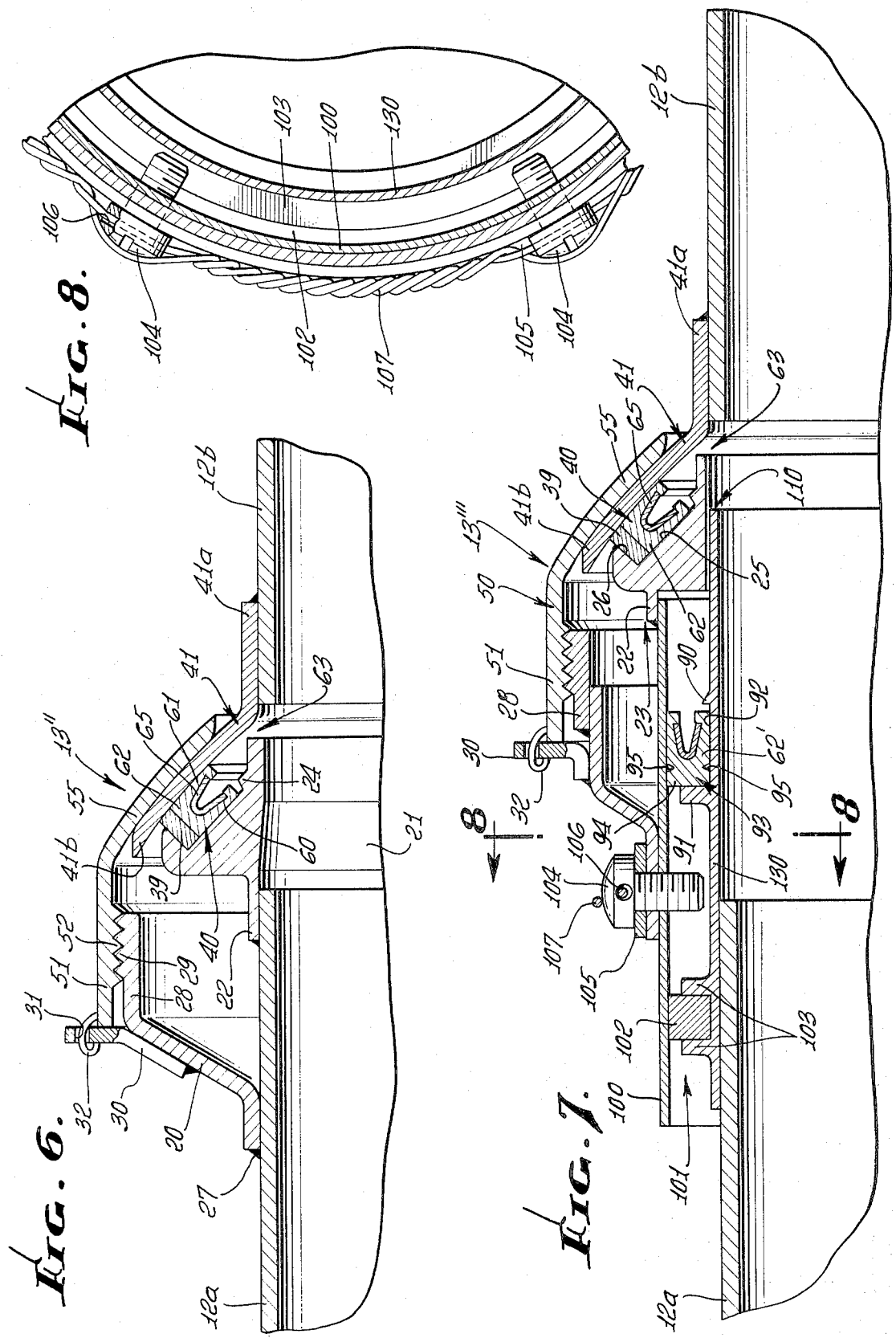

DUCT JOINT

BACKGROUND OF THE INVENTION

The present invention relates to duct joints and more particularly to an improved gastight flexible duct joint arrangement. The terminology "flexible duct joint" as used herein refers to the type of joint or coupling between ducts which is capable of permitting and accommodating positional changes between a pair of ducts interconnected thereby.

Gastight flexible duct joints are employed, for example, in the air conditioning and pressurization systems of aircraft. Due to variations in temperature, pressure, wind and other variables which influence an aircraft in flight and the stress caused on the aircraft body during takeoffs and landings, the rigid duct sections in these pressurized air systems generally experience frequent and sudden positional changes with respect to each other. Heretofore, prior art gastight flexible duct joints consisted of flexible bellows joints which were not capable of rotation and had a fairly limited cycle life in the way of angulation. Other versions of duct joints utilized various types of horizontally arranged seals, but they too had limited cyclic angulation capability and rather significant leakage rate.

SUMMARY OF THE INVENTION

It is, accordingly, an object of the present invention to provide an improved flexible duct joint arrangement suitable for use in the air conditioning and pressurization systems of aircraft.

It is, further, an object of the present invention to provide an improved joint arrangement as set forth which includes a pressure setting gastight, fluidtight seal suitable for positioning between joint parts which rotate and angulate with respect to each other.

It is, additionally, an object of the present invention to provide an improved flexible duct joint arrangement capable of accommodating rotational changes in position between a pair of ducts interconnected thereby.

It is, also, an object of the present invention to provide an improved flexible duct joint arrangement capable of accommodating angular changes in position between a pair of ducts interconnected thereby.

It is another object of the present invention to provide an improved flexible duct joint arrangement capable of accommodating axial changes in position between a pair of ducts interconnected thereby.

In accomplishing these and other objects, there is provided in accordance with the present invention several embodiments of gastight flexible duct joints. Each of the joints is designed to rotatably interconnect the ends of a pair of fluid conducting ducts so as to permit rotational and angular changes in position between the interconnected ducts. Further, the joints may be designed to permit the axial movement of one of the ducts relative to the other, thereby to accommodate axial changes in position between the interconnected ducts. Seal means are mounted in the joints between moving parts to make gastight seals therewith. Each of the seal means is made of a resilient annular member having an inner and outer sealing lip. A springlike reinforcing liner, preferably metal, is included in the seal means to reinforce the sealing lips and define the gas pocket by forcing the sealing lips away from each other. The lips are interconnected to form an annular gas pocket which communicates with the interconnected ducts so that the pressurized gas therein forces the sealing lips outward against the moving parts of the joints. Thereby, the sealing lips are set and maintained in gastight sealing relationships with the joint parts. The seal means designed for positioning between the joint parts which rotate and angulate with respect to each other is tilted away from a position perpendicular to the plane of its annular body to a position which conforms with the shape of the joint parts it contacts.

Additional objects of the present invention reside in the specific construction of the several embodiments of duct joints hereinafter particularly described in the specification and shown in the several drawings.

BRIEF DESCRIPTION OF THE DRAWINGS

FIG. 4 is a longitudinal sectional view of the duct joint of FIG. 2 taken along the line 4—4 of FIG. 2.

FIG. 5 is a longitudinal sectional view of another embodiment of duct joint according to the present invention.

FIG. 6 is a longitudinal sectional view of still another embodiment of duct joint according to the present invention.

FIG. 7 is a longitudinal sectional view of yet another embodiment of duct joint according to the present invention.

FIG. 8 is a view taken along the line 8—8 of FIG. 7.

DETAILED DESCRIPTION OF THE PREFERRED EMBODIMENTS

Figure 1:
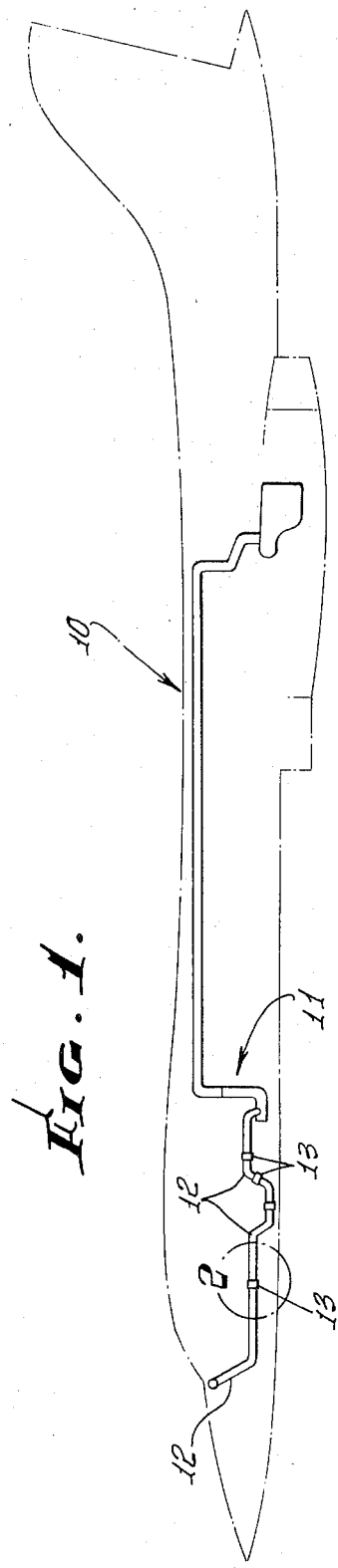
FIG. 1 is a side view of an air conditioning and pressurization system of an aircraft (the aircraft being shown in phantom) illustrating several gastight flexible duct joints according to the present invention.

Referring to the drawings in more detail, there is shown in FIG. 1 in phantom an aircraft 10 having an air conditioning and pressurization system generally indicated by the numeral 11. The air system 11 includes a plurality of rigid ducts or tubes 12 interconnected by duct joints 13. The ducts 12 can be made of various metals, such as titanium, stainless steel, etc., depending on particular applications and requirements.

FIRST EMBODIMENT

Figure 3:
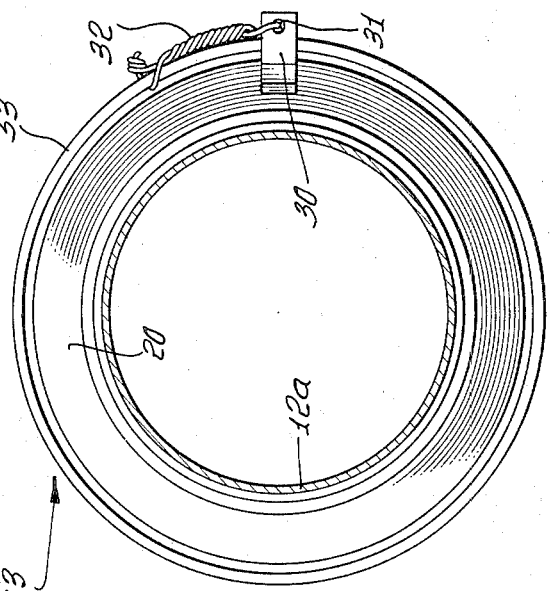
FIG. 3 is a view taken along the line 3—3 of FIG. 2.
Figure 2:
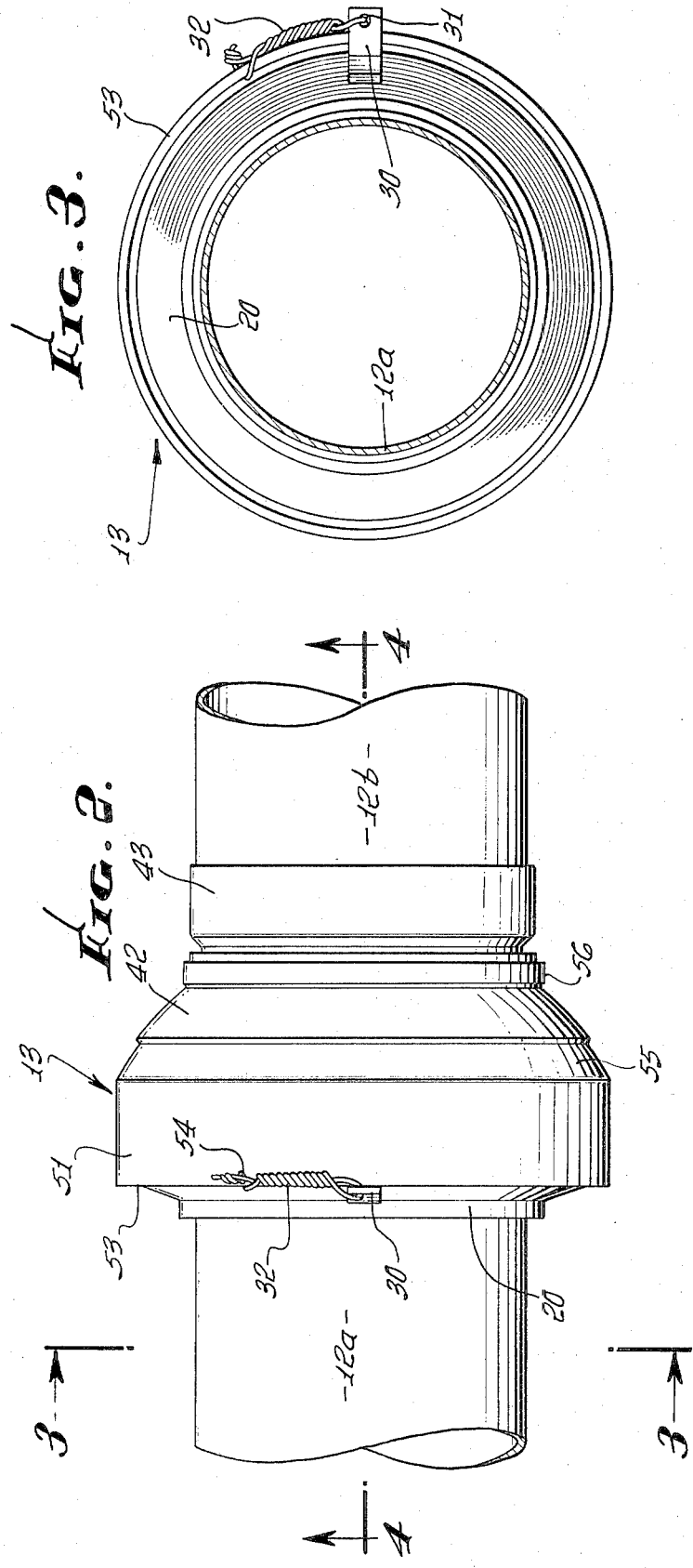
FIG. 2 is an enlarged side view of the duct joint according to the present invention encircled in FIG. 1 by the dashed line circle designated 2.

One embodiment of duct joint 13 according to the present invention is shown in FIGS. 2–4. This joint 13 is illustrated connecting two similarly sized cylindrical ducts 12 in communication with each other. For reference purposes, the lefthand and righthand ducts are designated 12a and 12b, respectively.

The duct joint 13 is made up of two halves. The lefthanded half of the joint 13, as shown in FIG. 4, includes a standoff piece 20 and a cylindrical joint section 21. The sleeve 20 and joint section 21 are each preferably made of titanium. The cylindrical section 21 is designed to have an inner diameter substantially equal to the inner diameters of the tubes 12. The section 21 has a collar portion 22 which fits over and is welded to the righthanded end of the tube 12a in a gastight sealing relation therewith. With the collar 22 secured in place on the tube 12a, the cylindrical joint section 21 is aligned with the tube 12a to insure a smooth flow of air therethrough.

The section 21 forms part of a seal gland structure 23. The structure 23 includes a lip 24, a tilted bearing surface 25 and a stop 26. The lip 24, stop 26 and seal seat formed by the surface 25 are formed around the outer periphery of the section 21. The stop 26 is located adjacent the collar 22 while the lip 24 is located adjacent the other end of the joint section 21. The bearing surface 25 slants outward from the lip 24 to the stop 26, and the lip 24 and stop 26 project outwardly substantially at right angles to the bearing surface 25. The bearing surface 25 slants, for example, at an angle of 45° to the longitudinal axis of the duct joint 13.

The seal gland structure 23 holds an annular seal 40. The seal 40 is fitted over the annular lip 24 to rest on the tilted annular bearing surface 25 between the lip 24 and the annular stop 26. A backup ring 39, preferably made of polyimide, is positioned between the stop 26 and the seal 40. The seal 40 itself is hereinafter described in greater detail. The backup ring 39 functions to support the seal 40 and prevent extrusion of the seal 40 at high pressures. The backup ring 39 has flat front and back surfaces which extend parallel to the bearing surface of the stop 26. Thus, the front and back surfaces of the backup ring 39 when in situ extend at approximately 45° angles to the axis of the joint 13. The backup ring 39 is made of polyimide since this is a plastic which withstands high temperatures, is substantially rigid and has lubricating characteristics.

The standoff 20, which is part of the lefthand half of the joint 13, is secured to the tube 12a, preferably by welding, at a position 27 thereon. The position 27 is located on the tube 12a near, but not at, its righthanded end. The standoff 20 projects outwardly from the tube 12a and supports on its outer end a threaded cylindrical collar 28. The collar 28 is preferably made of titanium integral with the standoff 20 and has threads 29 formed on its outer periphery.

Welded to the outer surface of the standoff 20 is at least one outwardly extending tab 30. The tab 30 has a hole 31 defined therein, as shown in FIG. 3, through which a wire 32 may be tied or looped to prevent the joint 13, when assembled as hereinafter described, from disassembling.

The righthand half of the joint 13 is made up of an inner bearing member 41, preferably made of titanium, and a hold down member 42. The member 41 has a cylindrical collar portion 41a which fits around and is attached to the smaller end of a cylindrical transition duct section 43. The collar portion 41a is secured around the transition section 43 in a gastight sealing relation therewith, preferably by being welded thereto.

The inner bearing member 41 also has a race portion 41b. The race portion 41b is formed as a continuation of the collar 41a and expands outwardly away from the lefthand end of the tube 12b to extend over and around the annular seal 40. The race portion 41b is arcuate, curving slightly inwardly to form a spherical race. The spherical surface of the race 41b conforms substantially in shape to the gland seal bearing surface 25.

When the joint 13 is assembled, the race portion 41b bears against the backup ring 39 and the seal 40 so that a gastight seal is formed between the seal gland structure 23 and the inner bearing member 41. It is noted that the ring 39 supports the inner member 41 out of contact with the stop 26 while at the same time giving support to the seal 40 since the backup ring 39 extends outwardly from the bearing surface 25 a distance greater than the height of the stop 26.

Ball bearing means 45 are fitted around the inner race 41b to bear thereagainst. The ball bearing means 45 includes ball bearings 46 which are held in one or more longitudinally spaced apart rows by a spherically shaped segment or retainer ring 47. The retainer ring 47 is preferably made of a monel type metal.

The outer portion of the joint 13 is formed by an outer sleeve 50. The sleeve 50 is preferably made of titanium. The lefthand end of the sleeve 50, as shown in FIG. 4, is formed by a cylindrical coupling 51 which has threads 52 formed on its inner periphery. The threads 52 are designed to mate with the threads 29 on the collar 28 so that the sleeve 50 may be threaded on the lefthand half of the joint 13, as shown in FIG. 4.

It is noted that an unthreaded edge portion 53 of the sleeve 50 extends slightly to the left beyond the threads 29 on the collar 28. A hole 54 is formed in this extending edge portion 53 through which the wire 32 may be tied or looped. Thereby, by attaching the wire 32 between the tab 30 and the hole 54 and twisting or otherwise securing the wire 32 tautly, the sleeve 50 may be locked in position relative to the collar 28 to prevent it from accidentally unthreading and uncoupling.

The other or righthanded end of the sleeve 50 is formed by an outer bearing member or race 55. The race 55 extends around and laps over the ball bearing means 45. The race 55 is spherical and conforms substantially at least on its inner peripheral surface with the spherical curvature of the outer peripheral surface of the inner race 41b. The curvature of the race 55 is positioned in alignment with the curvature of the race 41b. The aforementioned hold down member 42 is entrapped on the collar portion 41a of the inner bearing member 41 by butting against a weld band 56 secured to the collar portion 41a. The hold down member 42 preferably conforms in curvature to the outer portion of the race 55 which it slidably contacts and holds the race 55 in contact with the ball bearings 46. The hold down member 42 may be made of a suitable material other than titanium so that there is no titanium to titanium contact when the joint 13 rotates. The hold down member 42 functions to hold the righthand half of the joint 13 together whenever the left and righthand sections of the joint are uncoupled. Thereby, the righthand half of the joint 13 is always ready for coupling to the lefthand half by threading the sleeve 50 on the collar 28.

The seal 40 in the joint 13 is formed by a resilient, annular body member which has inner and outer lips 60 and 61, respectively. A material in the flurocarbon family of plastics, such as fluroalloy K, is preferably employed for forming the body of the annular seal member. The lips 60 and 61 extend at a substantial angle from an annular base portion 62 which contacts the backup ring 39. The base or back portion 62 of the seal 40 preferably extends parallel with the front flat surface of the backup ring 39. Thus, the base 62 extends substantially at a 45° angle to the axis of the joint 13 and the lips 60 and 61 of the seal 40 tilt at approximately a 45° angle to the plane of the seal's annular body. A U or V-shaped gas pocket is formed between the lips 60 and 61 which opens at the front edges of the lips 60 and 61 and communicates with the ducts 12 through the gap 63 between the cylindrical section 21 and the left end of the collar portion 41a.

The gas pocket formed by the lips 60 and 61 is reinforced by a layer of metallic material 65. The metallic material is preferably a relatively thin strip of stainless steel and the layer 65 is formed by coiling the stainless steel strip to form a toroid and then using a die to squash the toroid along its center radially outward. Thereby, an annular insert 65 is formed which has a U or V-shaped cross-section and functions as a spring to hold the sealing lips 60 and 61 away from each other in an almost mutually parallel position. Thereby, the sealing lips 60 and 61 are appropriately positioned for bearing against the gland seal bearing surface 25 and the spherical race 41b. It is noted that the outer edges of the lips 60 and 61 are formed to project slightly towards each oteer, thereby to provide structure 64 to retain the metal insert 65 within the gas pocket.

While the toroidal steel strip is preferred, any type or shape resilient material, such as a coil spring may be used to force the lips 60 and 61 apart.

The embodiment of duct joint 13 illustrated in FIGS. 2–4 rotatably interconnects the ducts 12a and 12b while forming a substantially gastight seal so as to permit unrestricted rotation and a predetermined degree of angulation therebetween. The duct 12b is joined in gastight sealing relationship with this joint 13 by inserting it within the larger end of the transition section 43. Preferably, the duct 12b is welded to the transition section 43.

In operation of the joint 13, rotation or angulation of the duct 12a relative to the duct 12b causes the inner and outer bearing spherical races 41b and 55 to roll on the ball bearings 46. During the rotation of the bearing races relative to each other, the hold down member 42 slides on the outer periphery of the race 55 and the inner peripheral surface of the race 41b moves relative to seal gland structure 23 by sliding around the seal 40 and the backup ring 39. It is noted that all parts in moving contact with each other are designed to have little friction so that wear is limited as much as possible. Further, it is noted that this joint embodiment is constructed so that there is no moving contact between any two titanium parts. Also, it is noted that there is no limit to the extent that one duct may rotate relative to the other. The angular or angulation movement of the ducts 12a and 12b relative to each other is limited only by the dimensioning of the joint parts. For example, by increasing the diameter of the spherical races 41b and 55 along with their associated parts, the amount of angulation permitted between 12a and 12b may be increased.

The flexible duct joint 13 is effectively gastight since the seal 40 seals the region between the inner race 41b and the seal gland structure 23, and the collars 41a and 22 make gastight seals with, respectively, the transition section 43 and the duct 12a. The pressure of the gas in the duct 12 functions to force the sealing lips 60 and 61 outwardly so that the seal 40 is set and maintained in a gastight sealing relationship with the race 41b and bearing surface 25. As a result, as gas pressure in the ducts 12 increases the seal 40 is set more tightly by the presence of this pressure in the gas pocket defined by the sealing lips 60 and 61. Further, it is noted that the sealing lips 60 and 61 are tilted to extend at the same angle to the plane of the annular seal member 40, i.e., 45°, that the bearing surface 25 and race 41b make with the axis of the joint 13. Due to this fact, the sealing lips 60 and 61 are positioned to make effective seals with the race 41b and bearing surface 25 during both rotation and angulation movements of the joint 13.

The ball bearings 46 in addition to aiding the rotation of the joint parts relative to each other also function to carry the end load on the joint 13, thereby relieving the seal 40 from this load. The end load is the tendency of a joint to be pushed apart by the outward pressure force of the gas or fluid being conducted therethrough.

SECOND EMBODIMENT

Another embodiment of duct joint in accordance with the present invention is shown in FIG. 5. This joint embodiment is designated 13' for purposes of discussion. The same numerals used in connection with the joint 13 are employed to identify the corresponding parts in the joint 13'.

The joint 13' is constructed and operates in substantially the same manner as the joint 13 to rotatably interconnect the ducts 12a and 12b. The joint 13' also is constructed to accommodate or allow axial movement of the ducts 12a and 12b relative to each other.

As shown in FIG. 5, seal gland structure 80 is secured, preferably by welding, around the righthanded end of the conduit 12a. The seal gland structure 80 is preferably made of titanium and includes a cylindrical collar portion 81 upon which is formed an outwardly projecting annular lip 82 and annular stop 83. The lip 82 is formed around the righthand end of the collar portion 81 and the stop 83 is positioned to the left of the lip 82. A bearing surface or seat 84 for a seal is defined by the collar 81 between the lip 82 and stop 83. A seal 85 and backup ring 86 which have similar parts to the abovedescribed seal 40 and backup ring 39 are fitted in the gland structure 80 between the lip 82 and stop 83. The parts of the seal 85 are identified by the same numerical designations with a prime added employed in connection with the seal 40. An important and significant difference, however, between the seal 85 and the above-described seal 40 is that the seal 85 is formed with its gas pocket extending perpendicularly to the plane of its annular body while the seal 40 has its gas pocket tilted away from a perpendicular position to slant at an angle of other than 90° to the plane of its annular body.

In the joint 13', the collar 22 on the cylindrical joint section 21, which collar forms part of the seal gland structure 23, extends over and bears against the seal 85 and ring 86. The left end of the collar 22, as shown in FIG. 5, is resting against the annular stop structure 87. The structure 87 extends around the duct 12a and collar 81, and supports the standoff piece 20. The threaded collar 28 is shown welded to the standoff 20 in the joint 13' rather than being made an integral part thereof as in joint 13. It is also noted in the joint embodiment 13' that no transition section 43 is used and that instead the collar 41a of the inner bearing member 41 is welded directly to the duct 12b.

The joint 13' permits the ducts 12a and 12b to rotate and angulate by movement of the bearing races 41b and 55 on the ball bearing means 45. Additionally, the ducts 12a and 12b may move axially with respect to each other since the seal gland structure 80 is free to slide relative to the stop structure 87. It is noted that stop structure 87 limits the maximum distance the ducts 12a and 12b may move axially away from each other since at a predetermined distance, depending on the location of the stop 87, the stop 87 will engage the stop 83 to prevent further outward movement.

The joint 13' provides a substantially gastight seal with the seal 40 sealing the region between the rotating joint parts and the seal 85 sealing the region between the longitudinal or axially moving joint parts. The gas pressure in the ducts 12a and 12b sets and maintains the sealing lips of both the seals 40 and 85 in tight contact with the joint parts which they bear against. As beforementioned, the gas from the ducts 12 communicates with the gas pocket of the seal 40 through the gap 63. With regard to the seal 85, the pressurized gas or air from the duct 12 communicates with the gas pocket thereof through the gap 88 between the cylindrical section 21 and the seal gland lip 82.

THIRD EMBODIMENT

A modified form of the duct joint 13 is shown in FIG. 6. This joint embodiment is designated 13" for purposes of discussion. The same numerals used in connection with the joint 13 are employed to identify the corresponding parts of the joint 13".

The joint 13" rotatably interconnects the ducts 12a and 12b, and is constructed and operates in substantially the same manner as the joint 13 with the hereinafter noted exception. The exception is that the ball bearing means 45 have been eliminated and the joint 13" designed so that the spherical races 41b and 55 rotate in direct contact with each other. Further, with the elimination of the ball bearing means 45, no hold down member is necessary to retain the ball bearing means 45 as in the first and second embodiment.

FOURTH EMBODIMENT

A modified form of the duct 13" is shown in FIGS. 7 and 8. For purposes of discussion, this joint embodiment is designated 13'''. The same numerals used in connection with the joint 13" are employed to identify the corresponding parts in the joint 13'''.

The joint 13''' rotatably interconnects the ducts 12a and 12b in the same manner as the joint 13". The joint 13''' also is constructed to permit axial or longitudinal movement of the ducts relative to each other.

The duct 12a has a sleeve 130 secured, preferably by welding, around its righthand end in a gastight sealing relationship therewith. Seal gland structure is formed on the sleeve 130 made up of an annular lip 90 and an annular stop 91. The lip 90 and stop 91 each project outwardly and the lip 90 is located nearer the right end of the sleeve 130 than the stop 91. The outer peripheral portion of the sleeve 130 forms a seat or bearing surface 92 for a seal 93. The seal 93 is substantially identical to the earlier described seal 85 except that a backup ring type structure 94 is formed as an integral part thereof. The structure 94 is joined with the base portion 62' of the seal 93 so as to be positioned to bear against the stop 91. It is noted that the parts of the seal 93 are given the same numerical designations as the corresponding parts of the seal 85. It is also noted that wedge shaped grooves 95 are preferably formed in the inner and outer peripheral sides of the seal 93 which define the backup ring structure 94 from the seal base portion 62'.

Positioned around the righthand end of the conduit 12a is a cylindrical section or bearing member 100 which bears against the seal 93. The collar 22 of the cylindrical joint section 21 is attached, preferably by welding, to the righthand end of the section 100, as shown in FIG. 7. The cylinder 100 forms an extension of the collar 22 and a part of the seal gland structure 23. Bearing or guide means 101 are formed on the outer periphery of the sleeve 130 at a longitudinally spaced apart point from the seal 93, preferably at a point more remote from the righthand end of the sleeve 130 than the location of the seal gland structure holding the seal 93. The guide 101 is preferably formed by a split annular ring 102 which is held in place by stops 103. The ring 102 is preferably made of polyimide to provide a substantially rigid lubricating bearing surface capable of withstanding high temperatures for the cylinder 100 to slide across. The ring 102 is preferably rectangular in cross-section and functions to maintain the cylindrical section 100 concentric with the sleeve 130 to prevent angulation at the seal 93.

The standoff sleeve 20 is bolted to the outer surface of the cylinder 100 by screwing a plurality of screws 104 through threaded holes in the section 100 and standoff 20. An annular spacer or load weld 105 extends around the sleeve, is preferably welded thereto and is drilled to align with the threaded hole. Such spacer will insure a proper bite of the screws 104 into cylinder 100. Holes 106 may be formed through the screw heads and a wire 107 passed therethrough to wire the screws 104 in place, as shown in FIG. 8. It is noted that in the joint 13''' the threaded collar 28 is welded to the standoff sleeve 20 rather than being formed as an integral part thereof.

The joint 13''' permits the ducts 12a and 12b to rotate and angulate by sliding movement of the bearing races 41b and 55 against each other. Additionally, the ducts 12a and 12b may move axially with respect to each other and angulation of the sleeve 100 with respect to the duct 12a is prevented by the substantially rigid guide ring 102. When the ducts 12a and 12b move axially with respect to each other, the cylindrical section 100 slides across the seal 93 and the guide ring 102. The amount that one duct 12 can move axially relative to the other is limited by the stop arrangement formed by the lower ends of the screws 104 which project between the stops 91 and 103.

The joint 13''' provides a substantially gastight seal. The manner in which the seal 40 functions has been described above. With regard to the seal 93, the pressurized gas or air from the ducts 12 communicates with the gas pocket thereof through the gap 110 between the cylindrical section 21 and the sleeve 130.

Thus, there have been provided several embodiments of an improved flexible duct joint. Further, an improved tilted seal arrangement has been provided for sealing the region between joint parts which angulate and rotate with respect to each other which utilizes the pressure of the fluid being conducted in the ducts to set and maintain its sealing relationship.

Although we have herein shown and described our invention in what we have conceived to be the most practical and preferred embodiments, it is recognized that departures may be made therefrom within the scope of our invention.

We claim:

1. A flexible duct joint for connecting one end of a first duct in gastight communication with one end of a second duct, comprising:

a first spherically shaped bearing member arranged for connection in a gastight sealing relationship around said one end of said first duct to extend outwardly therefrom symmetrically with respect to the longitudinal axis thereof;

a second spherically shaped bearing member, the inner spherically shaped peripheral surface of said second bearing member substantially conforming with the outer spherically shaped peripheral surface of said first bearing member, the outer and inner peripheral surfaces, respectively, of said first and second bearing members being spherically shaped bearing races;

structure for coupling said second bearing member to said second duct and holding said one end of said first duct adjacent said one end of said second duct with the inner peripheral surface of said second bearing member overlapping, adjacent and in alignment with the outer peripheral surface of said first bearing member whereby said bearing members are free to rotate and angulate whenever said ducts rotate and angulate relative to each other, said structure coupling said second bearing member to said second duct including a hold down means mounted on said first bearing member for holding said second bearing member in its overlapping, adjacent, aligned relationship to said first bearing member and also detachably coupling said second bearing member to said second duct;

ball bearing means positioned between and in contact with said bearing races;

means for selectively securing said coupling structure in its coupled position;

annular seal gland structure arranged for connection in a gastight sealing relationship around said one end of said second duct and defining adjacent the spherically shaped outwardly extending inner peripheral surface of said first bearing member a seat for an annular seal member; said seat being defined by an outwardly positioned stop, an inwardly positioned lip and a bearing surface extending between said stop and lip; said stop and lip being for retaining a seal member within said seat; said bearing surface substantially conforming in shape to the inner peripheral surface of said first bearing member; said stop having a height greater than the height of said lip but less than the distance between said bearing surface and the inner peripheral surface of said first bearing member;

a substantially rigid backup ring mounted in said seat of said seal gland structure adjacent said stop in position to support and thereby prevent extrusion of a seal member positioned therein, said backup ring extending outwardly from said bearing surface a distance greater than the height of said stop to contact the inner peripheral surface of said first bearing member, said backup ring being made of a material having lubricating characteristics so as to reduce the friction between said first bearing member and said backup ring;

an annular seal member fitted in said seat between said backup ring and said lip to seal the region within said joint between the inner peripheral surface of said first bearing member and said seal gland structure; said annular seal member being made of a resilient material; said seal member having outer and inner lips which extend at an angle to the plane defined by its annular body substantially equal to the outward slant of the inner peripheral surface of said first bearing member, said lips defining, respectively, the outer and inner peripheries of said seal member and said seal member including a flat base portion joining said lips and extending substantially perpendicularly thereto to define a seal member back; a gas pocket being defined in said seal member by said lips and base portion which opens at the front edge of said lips; said seal member being fitted in said seal gland structure with said base portion adjacent said backup ring, said outer lip bearing against the inner peripheral surface of said first bearing member, said inner lip bearing against said bearing surface and said gas pocket defined in said seal member communicating with the interior of said joint so that pressurized fluid being conducted therethrough enters said gas pocket to force said lips in tight sealing relationship against said seal gland structure and said first bearing member, said stop, backup ring and seal member base portion extending substantially perpendicular to said bearing surface; and a springlike liner positioned in the gas pocket of said annular seal member to force said sealing lips apart and reinforce said gas pocket.

2. The invention defined in claim 1, including:

structure means coupling said first annular seal gland structure on said one end of said second duct in gastight sealing relationship therewith for axial movement therebetween, said structure means including second seal gland structure connected in a gastight sealing relationship around said one end of said second duct, said second seal gland structure defining a seat for an annular seal member adjacent said first annular seal gland structure; and an annular seal member fitted in said seat defined by said second seal gland structure to make a gas-tight seal between said first and second annular seal gland structures.

3. The invention defined in claim 2, including:

an annular guide means mounted on said one end of said second duct in a longitudinally spaced apart relationship from said seat defined by said second seal gland structure, said guide means defining a cylindrical bearing surface; and wherein:

said first seal gland structure includes a cylindrical bearing member arranged for placement in an axially sliding relationship against the bearing surface of said guide means and against said annular seal member fitted in said seat defined by said second seal gland structure.

4. The invention defined in claim 3, wherein said annular guide means is located more remotely from said first duct than said second seal gland structure.

5. The invention defined in claim 4, including stop means for limiting the axial distance of movement between said first and second seal gland structures.

6. The invention defined in claim 1, wherein said backup ring is formed integral with said seal member.

* * * * *

UNITED STATES PATENT OFFICE
CERTIFICATE OF CORRECTION

Patent No. __3,799,586__ Dated __March 26, 1974__

Inventor(s) __Peter Caras and Walter E. Pike__

It is certified that error appears in the above-identified patent and that said Letters Patent are hereby corrected as shown below:

Assignee shown as "SSP INDUSTRIES" should be changed to -- SSP PRODUCTS, INC. --

Column 5, line 17, "oteer" should read -- other --.

Signed and sealed this 10th day of September 1974.

(SEAL)
Attest:

McCOY M. GIBSON, JR.
Attesting Officer

C. MARSHALL DANN
Commissioner of Patents